United States Patent [19]

Propp

[11] 4,054,525
[45] Oct. 18, 1977

[54] OIL SKIMMING APPARATUS

[76] Inventor: Carl F. Propp, Rte. 2, Box 97, Estacada, Oreg. 97023

[21] Appl. No.: 440,320

[22] Filed: Feb. 7, 1974

Related U.S. Application Data

[63] Continuation-in-part of Ser. No. 286,606, Sept. 5, 1972, abandoned.

[51] Int. Cl.² .................................................. E02B 15/04
[52] U.S. Cl. .......................... 210/242 S; 210/DIG. 25
[58] Field of Search ................ 210/83, 242, DIG. 21

[56] References Cited

U.S. PATENT DOCUMENTS

| 2,330,508 | 9/1943 | McCall | 210/242 |
|---|---|---|---|
| 2,876,903 | 3/1969 | Lee | 210/242 |
| 3,142,281 | 7/1964 | Muller | 210/242 X |
| 3,661,264 | 5/1972 | Peterson | 210/242 |
| 3,708,070 | 1/1973 | Bell | 210/DIG. 21 |
| 3,722,688 | 3/1973 | Wirshing | 210/242 |
| 3,730,346 | 5/1973 | Prewitt | 210/DIG. 21 |
| 3,752,317 | 8/1973 | Lithen | 210/242 |
| 3,754,653 | 8/1973 | Verdin | 210/242 |
| 3,756,414 | 9/1973 | Crisafulli | 210/DIG. 21 |
| 3,815,751 | 6/1974 | Pavlovic | 210/DIG. 21 |
| 3,822,789 | 7/1974 | Crisafulli | 210/DIG. 21 |

*Primary Examiner*—Theodore A. Granger
*Attorney, Agent, or Firm*—Eugene M. Eckelman

[57] ABSTRACT

Apparatus for removing oil and the like from the surface of water. A vessel has a sump in which a pump is provided for removing the oil and water mixture. The sump has a front inlet associated with a float and a connecting flexible apron directing the oil and water mixture from the float to the sump. The apron allows the float to move vertically and to pivot longitudinally and laterally such that the float can maintain a uniform feeding position independent of the main vessel. The float is disposed in a front opening of the vessel for compactness, and for directing oil into the inlet means.

9 Claims, 13 Drawing Figures

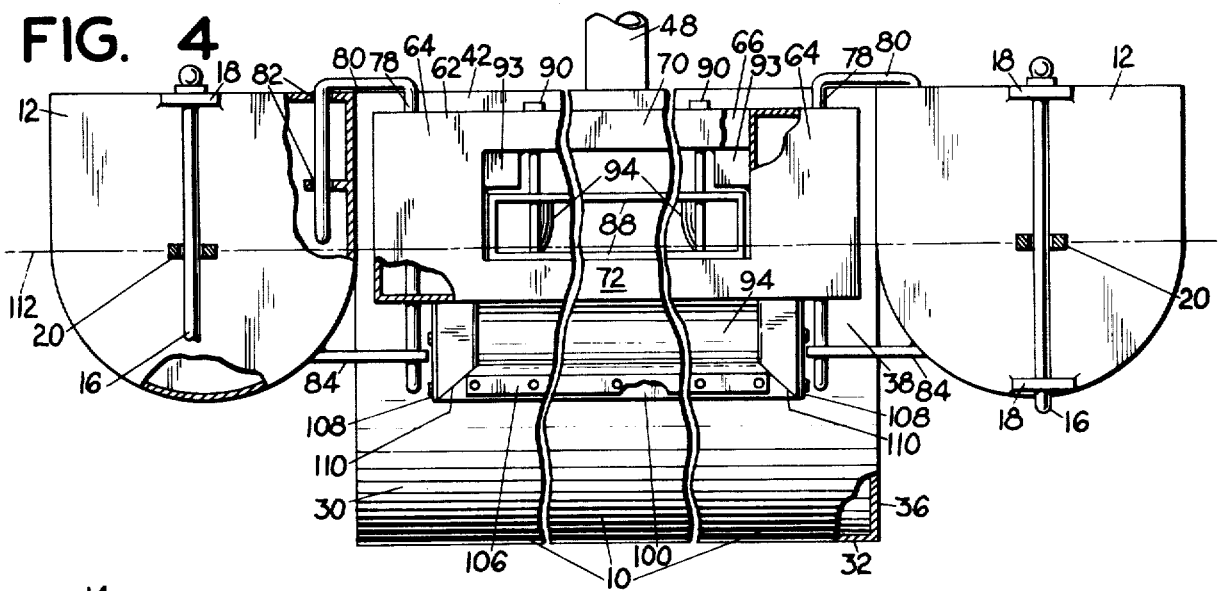
FIG. 4
FIG. 2
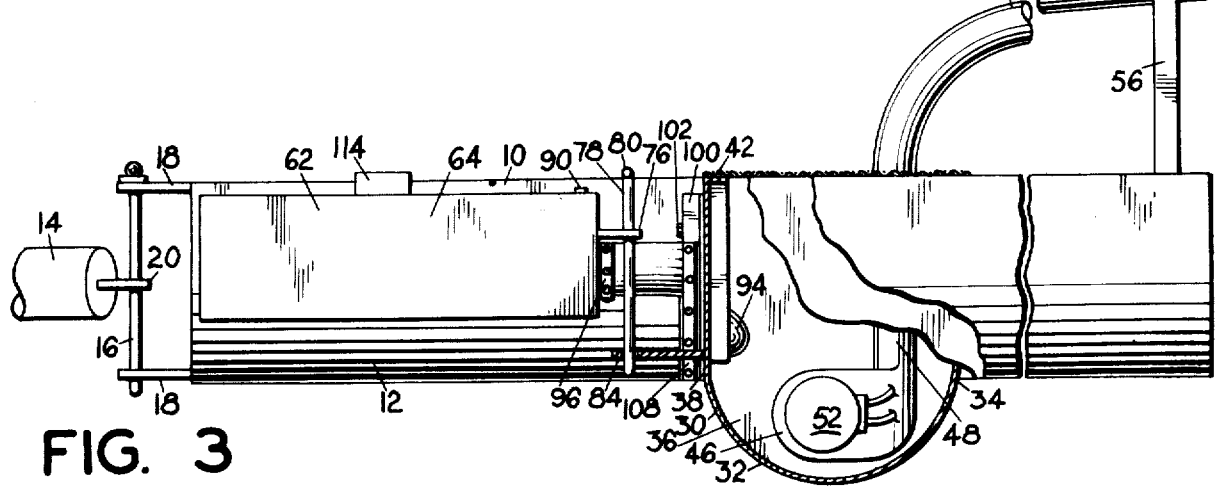
FIG. 3

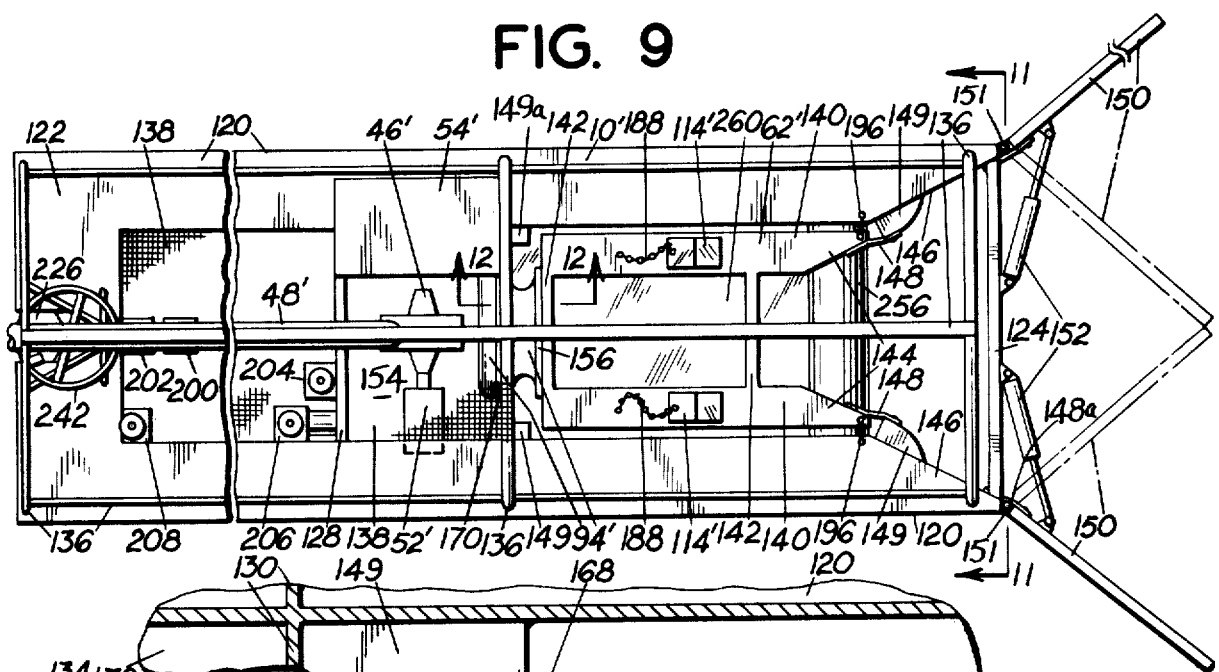
FIG. 9
FIG. 13
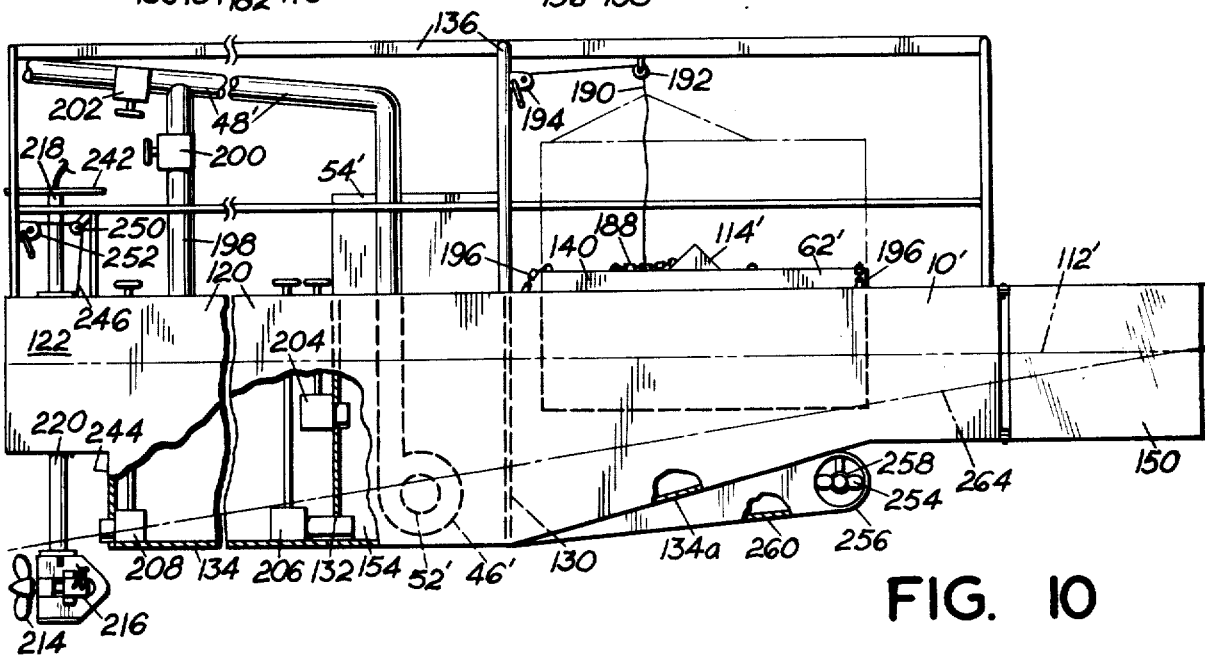
FIG. 10

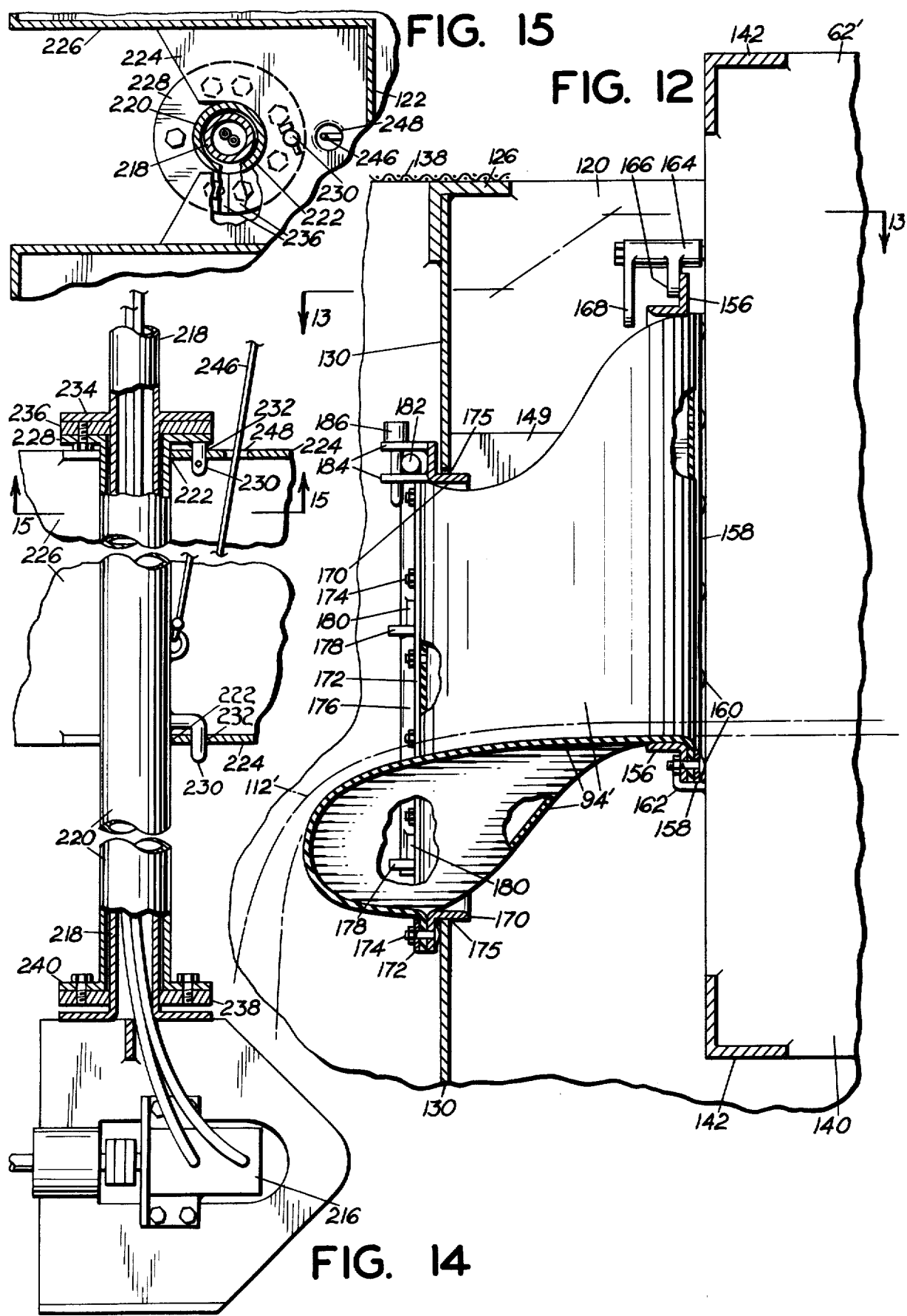

OIL SKIMMING APPARATUS

REFERENCE TO PRIOR APPLICATIONS

This is a continuation-in-part of application Ser. No. 286,606 Filed Sept. 5, 1972 for Oil Skimming Apparatus, now abandoned.

BACKGROUND OF THE INVENTION

This invention relates to new and useful improvements in oil skimming apparatuses.

Waste oil and other spillages on the surface of water are difficult to remove. Oil is especially difficult to remove because it spreads rapidly in a thin film or layer. Such spillages may occur on the open sea or in harbors, and in view of the dangerous aspect of such spillages due to the pollution caused as well as the fire hazard, it is desirable that they be picked up as soon as possible. Previous attempts have been made to handle this problem, one of which comprises treating the oil slick with material to cause it to sink, another of which comprises the use of a barrier or fence to confine the slick, with the oil later being picked up by suitable apparatus, and still another of which utilizes apparatus movable directly into the slick area to pick up the oil. Other variations of oil pick-up apparatus have also been proposed.

The present invention is concerned with apparatus as in the third example above wherein apparatus is movable directly into the slick area to provide a direct pickup of the oil. Devices of this type heretofore used have not been entirely adequate. One fault of such apparatuses is that they are complex in construction and expensive to manufacture. Another fault is that they do not provide means, at least in a simplified manner, to maintain a uniform infeed at least in rough water, and thus they are not sufficiently versatile to be usable on the open sea, rivers, or confined areas such as harbors. These prior apparatuses also plug easily if there is any debris in the water and thus they are not practical in an actual oil spill where much debris collects.

BRIEF SUMMARY OF THE INVENTION

According to the present invention and forming a primary objective thereof, an oil skimming apparatus is provided which is extremely versatile, having efficient usage either in open or confined areas.

It is another object of the invention to provide an oil skimming apparatus which under the above conditions is arranged to provide a substantially uniform inflow of oil and water mixture from the surface of the water even though the water surface may be surging or billowing.

Another object is to provide an oil skimming apparatus which is designed so that it will pick up debris with the oil and water mixture without plugging up.

More particular objects of the present invention are to provide an oil skimming apparatus which utilizes a main vessel associated with buoyant inlet means which is adjustable independently relative to the vessel to maintain a uniform inlet level into a sump in the vessel relative to the water surface; to provide apparatus whereby the inlet means comprises a longitudinally extending float arranged in a submerged position to allow said uniform inflow of water thereover; to provide apparatus wherein said inlet means includes a flexible apron extending between the float and the vessel for directing water flowing over the apron into the sump; and to provide apparatus wherein the independent adjustment is accomplished by the flexible apron and comprises vertical adjustment as well as pivot-type movements on both lateral and longitudinal axes, and obliquely, all to the advantage that there is provided a substantially uniform inlet flow into the vessel even though the water surface is choppy or is surging and billowing.

Another object is to provide an oil skimming apparatus of the type described which utilizes means at the front arranged to guide oil into the inlet means upon movement of the vessel in the diverging direction of the arms.

BRIEF DESCRIPTION OF THE DRAWINGS

FIG. 2 is a top plan view of the apparatus with a forward portion thereof broken away;

FIG. 3 is an enlarged and foreshortened fragmentary side elevational view, partly broken away, taken on the line 3—3 of FIG. 2;

FIG. 4 is an enlarged and foreshortened front elevational view, also partly broken away, taken on the line 4—4 of FIG. 2;

FIG. 9 is a top plan view of a further embodiment of the invention;

FIG. 10 is a side elevational view of the embodiment of FIG. 9, with portions thereof broken away for clarity;

FIG. 12 is an enlarged fragmentary sectional view taken on the line 12—12 of FIG. 9;

FIG. 13 is a fragmentary sectional view taken on the line 13—13 of FIG. 12;

FIG. 14 is a foreshortened fragmentary elevational view, partly broken away, showing drive and control means for the vessel; and FIG. 15 is a sectional view taken on the line 15—15 of FIG. 14.

DETAILED DESCRIPTION OF A PREFERRED EMBODIMENT

The present invention is described herein as an oil skimming apparatus but it is to be understood that the apparatus employed can be used for skimming almost any type of material floating on a water surface.

Figure 1:
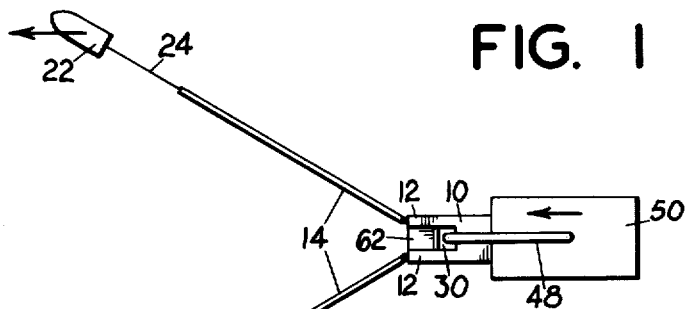
FIG. 1 is a top plan view in reduced size of an oil skimming apparatus utilizing principles of a first embodiment of the present invention.

Referring in particular to the drawings and first to FIGS. 1, 2 and 3, the present invention comprises a vessel 10 such as a barge having a pair of longitudinally extending arms 12. The arms 12 are disposed in parallel relation and, similar to rearward portions of the vessel, are flat on top to form walkways. The front area into the vessel between the arms is open and as will be more apparent hereinafter, the oil spillage or the like to be picked up by the vessel is directed into the area between these arms. To further direct oil on the water surface into the front of the vessel, a pair of booms 14 extend outwardly in divergent relation from the ends of the arms 12. Connection of the booms to the arms is accomplished by upright rods 16 engaged in forwardly extending ears 18 on the arms as well as in eyes 20 secured on the ends of the booms and slidably engaged with the rods 16. These eye portions have a rather loose or enlarged fit on the rods 16 so that not only can the booms move up and down freely in a plane parallel with the arms 12 but they can also pivot vertically and swing laterally. Thus, the booms can follow the general contour of the water without interfering with the operation of the vessel. Rods 16 preferably have removable engagement with the ears 18 for easy insertion and removal.

The booms 14 are of a buoyancy such that the portion thereof which projects above the surface of the water and the portion thereof which is submerged is capable of confining the floating material. Forward movement of the barge can be accomplished by tugs 22 suitably connected to the booms by tow lines 24, although as may be understood, the vessel 10 may be self propelled or pushed, in which case the booms would require anchoring against lateral movement by suitable guy lines. Rather than being pulled or pushed, the vessel in some cases may merely be anchored facing upstream in a natural stream flow or in the current, or in an ebb or flood tide.

Barge 10 has a sump 30, FIGS. 1–5, disposed rearwardly from the front end thereof. This sump is defined by an arcuate bottom wall 32, a rear wall 34, side walls 36, and a front wall 38. Front wall 38 has an opening 40, FIGS. 5 and 6, defined at its upper end by a transverse channel-shaped frame member 42. The bottom portion of wall 38 is reinforced by a transverse rearwardly turned flange or web 44.

A pump 46 is mounted in the sump 30 and has an outlet conduit 48 leading rearwardly of the vessel 10. Conduit 48 may lead to a collecting chamber 50, FIG. 1, which may be a part of vessel 10 or if desired may comprise a separate vessel connected to the vessel 10. Pump 46 is driven by conventional means, such as by an hydraulic motor 52 in turn driven by power means 54, FIG. 2, mounted on the vessel.

With particular reference to FIGS. 2 and 3, the rearward end of the conduit 48 is supported on an upright post 56. It may be desired that the rearward end of the conduit 48 be elevated to different positions, and for this purpose the post 56 may have a plurality of vertically spaced notches 58. The end of the conduit 48 is thus supported in a selected notch depending upon the rearward elevation desired.

Disposed forwardly on the sump 30 between the arms 12 is a float or weir 62, FIGS. 1–6. This float comprises a pair of longitudinally extending pontoons 64 connected together in parallel relation by rear upper and lower frame members 66 and 68 respectively, FIG. 5, an front upper and lower frame members 70 and 72, respectively, FIG. 4, A longitudinal opening thus extends through the float 62. This float has a pair of ears 76 on its rearward end for slidably receiving upright keeper bars 78, which, as best seen in FIG. 4, have reversely turned portions 80 extending outwardly over the top of arms 12 and then downwardly through guide apertures 82 in the arms. The bottom ends of the main body portion of keeper bars 78 also engage ears 84 extending inwardly from the arms 12. It is preferred that the keeper bars 78 be freely disengageable from the respective parts so that the float can be readily separated from the main vessel. This is accomplished by merely lifting out the bars. Furthermore, it is desired that each ear 76 have an enlarged aperture 86 through which its bars 78 passes, thus allowing free up and down movement of the float on the bars and also allowing the float to tip up and down longitudinally, namely, to pivot on a lateral axis relative to the vessel. Furthermore, the loose connection between the ears 76 and the bars 78 allows the float to tip sideways, namely, to pivot on a longitudinal axis relative to the vessel. Thus, the float can adjust up and down, pivot longitudinally and laterally, and also move obliquely relative to the main vessel. Because of its connection with the two bars 78, however, the float is steered with the main vessel in longitudinal movement of the latter.

Disposed in the rear opening of the float 62 is a box-like or tubular insert 88. The front and rear ends of this insert are open. Such insert is held in place by keeper pins 90 extending down through apertures 92 in frame members 66 and 68 and insert 88. Upon removal of the pins 90, the insert can be moved rearwardly and readily separated from the float 62. The insert is seated on lower frame member 68 and is confined in its upward movement by a pair of oppositely located spacer members 93 secured to the bottom of upper frame members 66.

Figure 5:
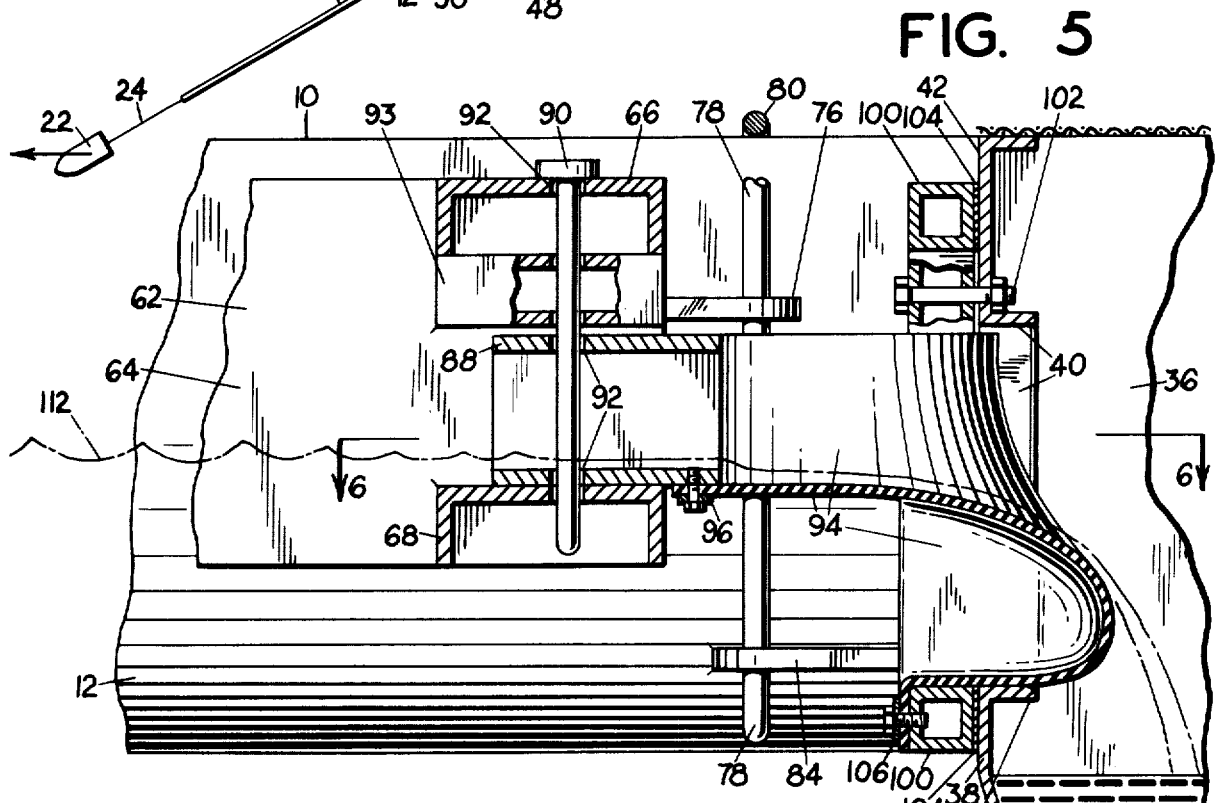
FIG. 5 is an enlarged fragmentary vertical sectional view taken on the line 5—5 of FIG. 2.
Figure 6:
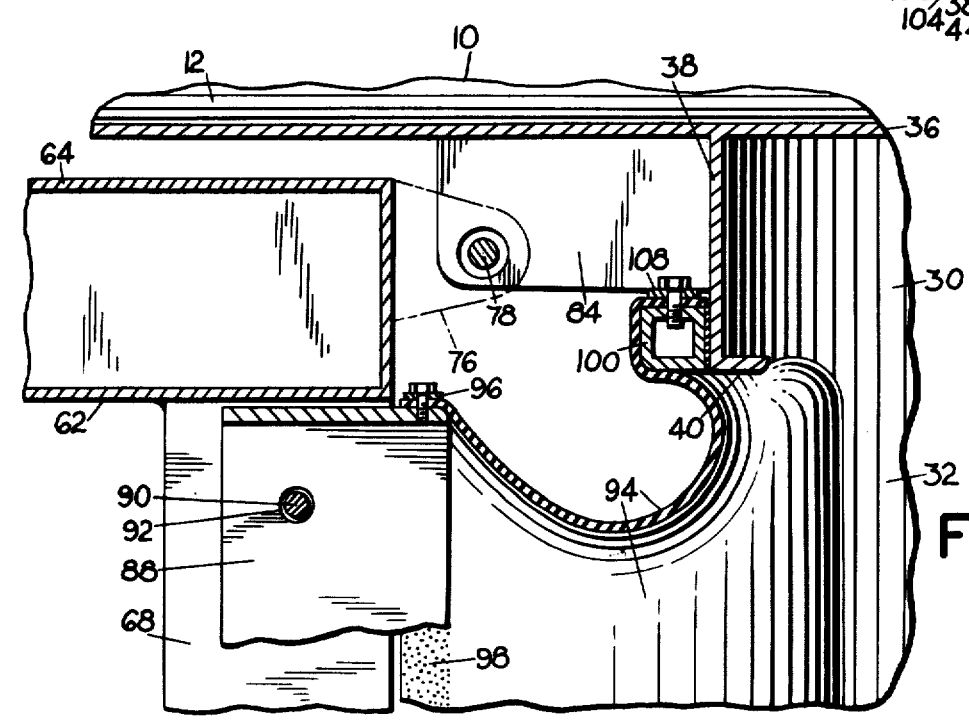
FIG. 6 is a fragmentary horizontal sectional view taken on the line 6—6 of FIG. 5.

Secured to the bottom and sides of insert 88, best seen in FIGS. 5 and 6, is a flexible apron 94. The connection of the apron to the insert is accomplished by any suitable means, such as by batten boards 96 or by adhesive connection 98, as shown in FIG. 6, or both. The rearward end of the flexible apron 94 is attached to a rectangular open center frame member 100 secured by bolts 102 at its top to transverse frame member 42. A gasket 104 is disposed between frame member 100 and the front wall 38. The connection of the apron to the frame member 100 is across the bottom front thereof and up the sides and is accomplished by the batten boards 106 and 108, respectively. To accomplish the connection of the apron to the frame 100, the bottom corners of said apron are suitably folded or slit at 110, FIG. 4. Suitable folding or cutting may also be necessary for connecting the forward end of the apron to the insert 88, it being desired that a watertight connection be provided at the front and rear ends of the apron to prevent inflow into the sump 30 underneath the apron.

With particular reference to FIG. 5, the buoyancy of the float 62 is such that in operation the bottom wall of insert 88 normally is submerged a slight amount below the water surface 112. In such arrangement, the water will flow through the insert and over the apron 94 into the sump. The amount of submergence is controlled by weights 114, FIG. 2, supported on the top of the float 62.

In a preferred arrangement, the float structure 62 is arranged such that without the weights the bottom wall of insert 88 is above water level. The float can thus be converted from a non-use condition to a use condition by placing the weights thereon. Thus, without the weights, the vessel can be moved without filling the sump, and when it has reached the desired location, the weights are placed thereon to make it operative.

In addition, the weights can be varied in position an amount to control the volume of flow over the apron. As an example, by moving the weights rearwardly, the float will tip up at the front to submerge the insert a greater amount and allow more flow of water into the sump. Conversely, by moving the weights farther toward the front, the amount of flow over the apron will be less. Also, it is apparent that as more weight is used the volume of flow will increase. The weights may merely be seated on the top of the float as shown but it is to be understood that they may be attached if desired but of course adjustable longitudinally.

In the operation of the present skimming apparatus, the vessel 10 is moved forwardly into the area to be skimmed, or, as stated above if the water has a current or tide the apparatus may be anchored facing the current. The float 62 is suitably adjusted by the weights 114 to provide the desired flow over the apron 94 into the sump. The apron and its connection between the insert and the frame 100 has sufficient slack to allow all the necessary vertical and pivotal adjustments of the float relative to the main vessel in order that the float can maintain a position of flotation independent of the main vessel. The slack portion of the apron will be curved rearwardly into the sump, FIG. 5, by the water pressure on the front thereof resulting from the forward movement of the vessel or the current, and such water pressure underneath said apron will hold it sufficiently rigid to form a spillway thereover. The force of the water against the front of the apron will hold the frame 100 at its sides and bottom securely against the front wall 38 of the sump. Such water pressure also forms a good connection at the gasket 104 between the frame 100 and the front wall 38.

The flexible apron 94 allows independent buoyant operation of the float 62 relative to the vessel 10 to accomplish the present invention. Such independent buoyancy and movement, including up and down movement, lateral tilting, longitudinal tilting and oblique tilting, maintains a uniform flow over the apron even though the water surface is surging and billowing. This is due to the ability of the float 62 to respond immediately to variations in the water surface and not be controlled by the slow to respond large collecting vessel.

Figure 7:
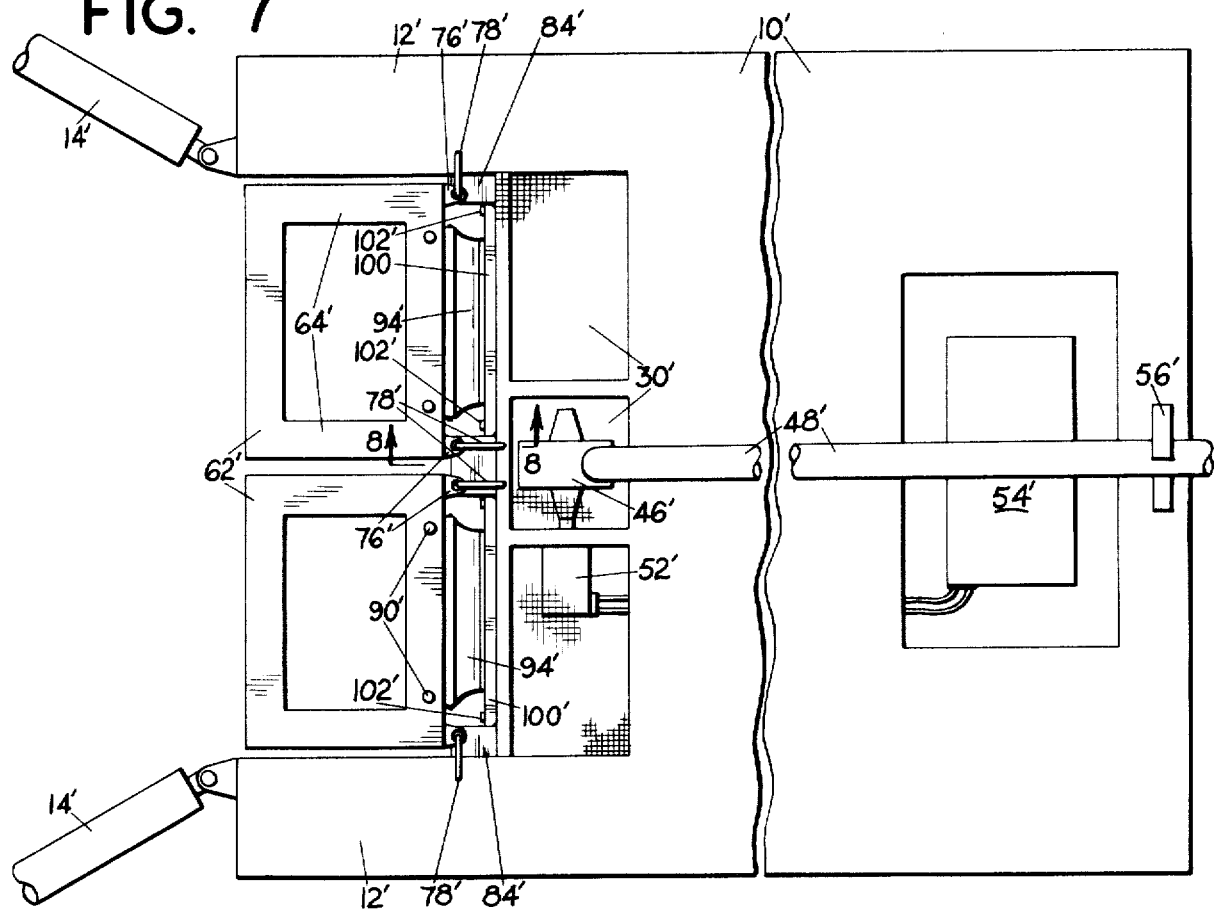
FIG. 7 is a foreshortened top plan view of a modified form of the apparatus.
Figure 8:
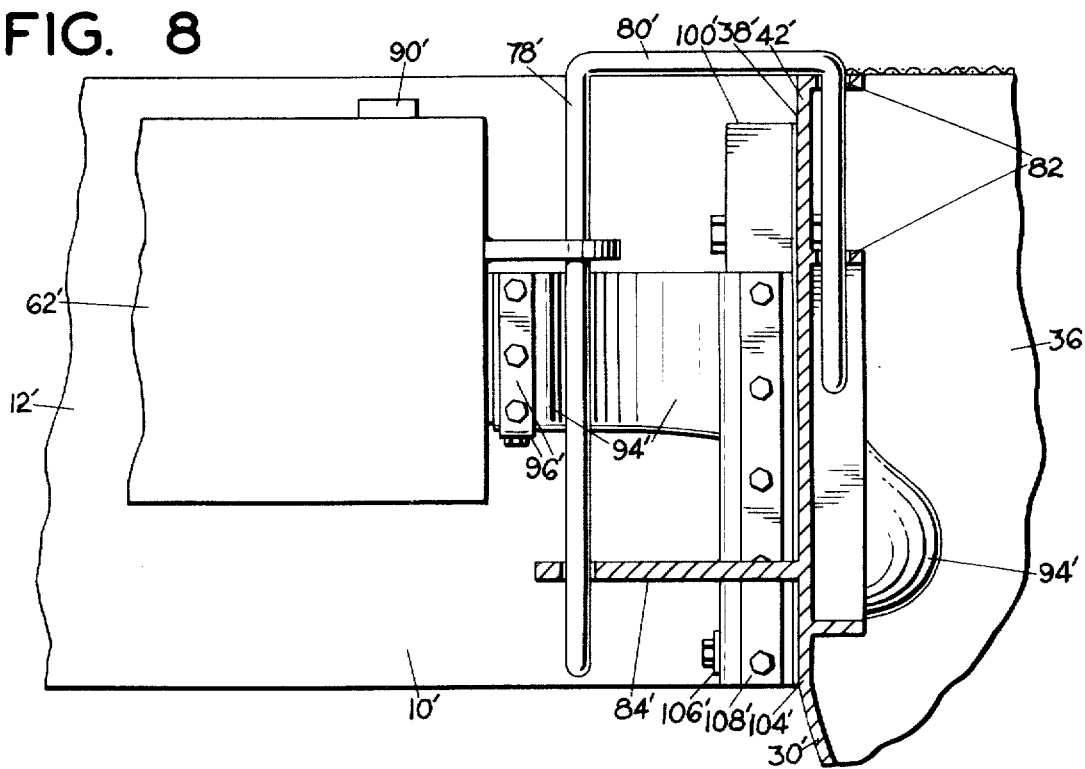
FIG. 8 is an enlarged fragmentary vertical sectional view taken on the line 8—8 of FIG. 7.

With reference to FIGS. 7 and 8, a vessel 10' is provided which has more than one float 62' contained within the area between the front arms 12'. This vessel construction is intended for making a wider sweep, and since the pickup portion must, according to the invention, react to the surging and billowing of the water surface, multiple floats 62' are provided instead of one large float. Any number of such floats may be provided depending upon the width of the vessel it being desired that the floats be of a size small enough to have fast reaction with the water surface and the number of floats in a given width of vessel thus depending on the width of the latter. Each of the floats 62' is of the same construction as in the FIG. 1 embodiment and have independent inserts 88' and aprons 94' associated with independent openings into a sump 30' having a pump 46 therein and outlet conduit 48. Floats 62', similar to the FIG. 1 embodiment, are connected to the vessel by means of keeper bars 70', such keeper bars at the inwardly disposed sides, however, extending longitudinally as best seen in FIG. 8 to engage guide apertures 82' in cross frame member 42' in the front wall 38' of the sump. The aprons 94' are connected to the rectangular frames 100' and such frames are bolted to the front wall 38'. The aprons are connected to their respective frames by front batten boards 106' and side batten boards 108'.

The embodiment of FIG. 9-15 illustrates a vessel 10' which is completely self-contained for operation in a spill area as well as movement to and from the spill area and for storage of a quantity of the foreign substance such as oil which is skimmed from the water surface.

The vessel comprises a U-shaped hull with longitudinal side portions 120 and a connecting portion 122 at the stern, the front of the hull being open. The portions 120 and 122 of the vessel comprise water tight compartments to provide buoyance for the vessel. The vessel includes transverse frame members comprising a forward frame member 124 and intermediate frame members 126 and 128, the latter two frame members being located respectively at upright bulkheads 130, FIGS. 12 and 13, and bulkhead 132, FIG. 10. The vessel has a bottom wall 134 the full width thereof with such wall also forming the bottom wall for the hull portions 120 and 122. This bottom wall angles upwardly in a portion 134a, FIG. 10, from the bulkhead 130 to a forward portion of the vessel.

Figure 11:
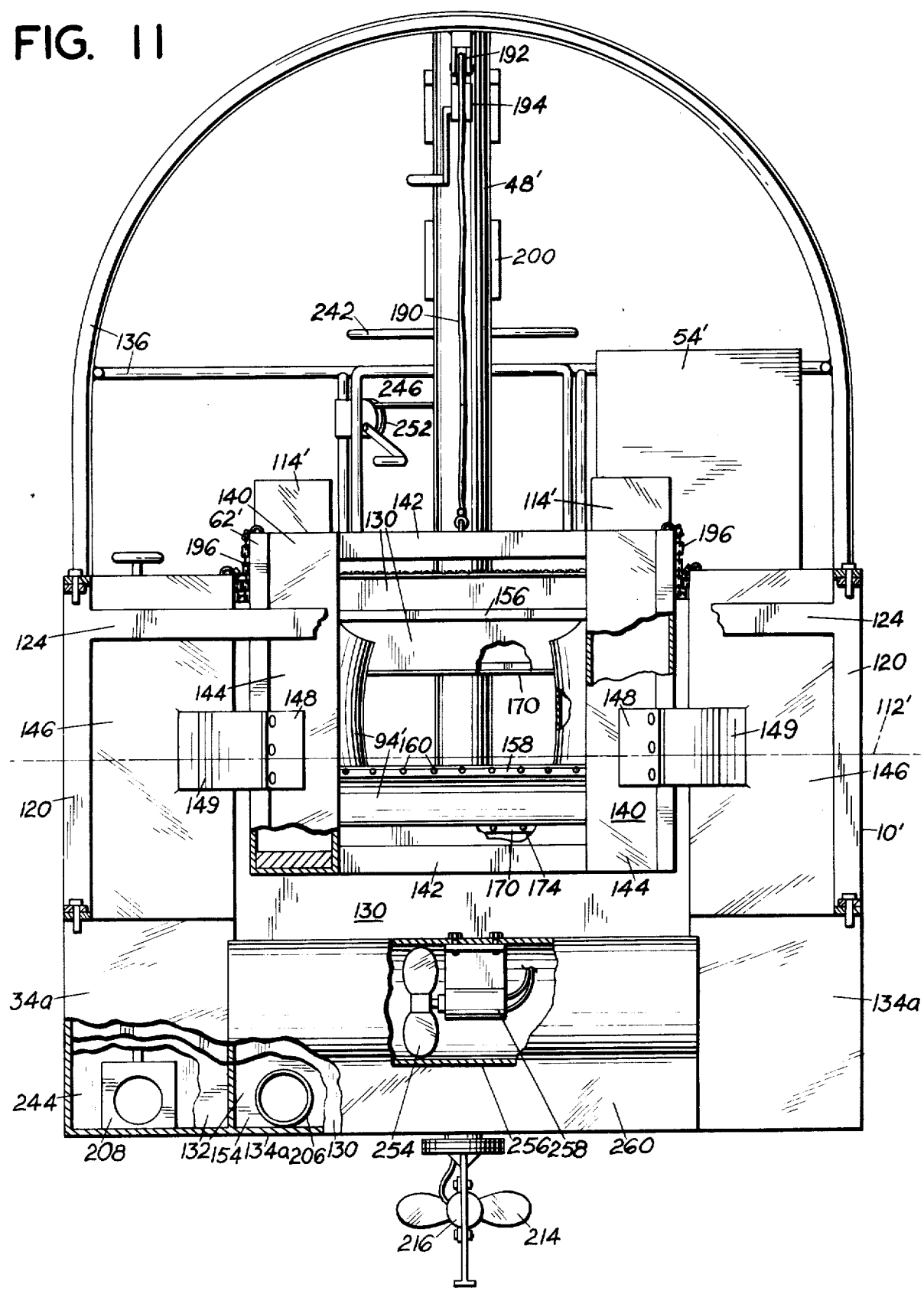
FIG. 11 is an enlarged front elevational view, partly in section, taken on the line 11—11 of FIG. 9.

A framework 136 extends upwardly from the deck of the vessel, as best seen in FIGS. 9-11, and such framework is intended to provide a support for a cover, not shown, and to provide hand rails in portions thereof. Suitable deck grating 138 is provided as necessary.

The skimming portion of the vessel includes a float or weir 62' comprising a pair of longitudinally extending pontoons 140 interconnected by forward and rearward top and bottom frame members 142, FIGS. 9 and 12. Pontoons 140 have forward ends 144 tapered outwardly toward the front, and the forward ends of the sides 120 of the hull have similar tapers 146. Tapered portions 144 and 146 direct water into the area between the float pontoons 140, and to prevent oil from flowing rearward between the float 62' and the inner walls of the portions 120, flaps 148 are secured at one of their ends to abutment blocks 149 mounted on the tapered portions of the hull. These flaps extend slidably into overlapping engagement with tapered portions 144 and are of a height dimension and selectively located such that the oil thickness floating on the water will all be directed into the float center. Abutment blocks 149a are secured to the inner wall of the hull 120 at the rearward end of float 62' and serve with the abutment blocks 149 to confine the float longitudinally therebetween.

The front of the vessel has doors 150, FIGS. 9 and 10, mounted on vertical axis hinges 151 on the front of the hull, and these doors are adapted to be swung between an open position as shown in full lines in FIG. 9 and a closed position as shown in phantom lines in this same FIGURE. The doors are moved by respective double acting fluid cylinders 152 pivotally connected between the doors and the front frame member 124. The open position of the doors comprises an outwardly flared position wherein water is directed into the float in a skimming position. Flaps 148a are secured at one of their ends to the doors 150 and have slidable engagement with the tapered portions 146. These flaps, similar to flaps 148, are of a height dimension and selectively located such that oil floating on the water will not leak outwardly through the hinges. The closed position of the doors forms a pointed structure or bow for transportation of the vessel through the water in a non-skimming operation.

Water which passes through the area between the pontoons 140 of the float 62' enters a sump 154 disposed rearward of bulkhead 130 over a flexible apron 94' which in its installed position has a bottom wall over which water flows and has side walls for confining the flow between the float 62' and the sump. Connection of the forward end of the apron is accomplished by a rectangular open center angle iron frame 156. The apron at its sides and bottom has inwardly turned portions secured to the frame 156 by batten members 158 removably secured to the frame 156 as by bolts 160. This assembly seats on forwardly extending hooks 162 secured adjacent the sides to the front of the float 62'. The top of this assembly is removably held in place by a pair of rotatable hand levers 164, one on each side, having a latch finger 166 thereon arranged to engage a forward surface of the frame 156 and hold it in place. The hand levers 164 have handles 168 whereby an operator can rotate them to fasten or release the latch fingers 166 relative to the frame 156. The hook projections 162 are located at a selected height on the float 162 so that the apron 94' as extending from the frame 156 leads generally in the area of the water level of the float.

The rearward end of the apron 94' is connected at the sides and at the bottom to a rear rectangular angle iron frame 170, FIGS. 12 and 13, by means of side and bottom batten strips 172 removably secured to the frame 170 as by bolts 174, the bottom corners of the apron being suitably folded or cut as necessary in order to be secured along the bottom and up the sides in a water tight connection.

Frame 170 is removably locked in an opening 175 in the bulkhead 130 by a pair of vertical bars 176 rotatably supported in a rearwardly projecting ears 178 secured on the bulkhead 130. Each of these bars has a pair of laterally extending projections 180 thereon which in one rotated position of the bar engage against the rear side of the apron holding assembly and hold the frame 170 in the opening 175. Latching rotation of the bars 176 is accomplished by a top right angle handle portion 182 thereon adapted to be swung to a lateral position and in such position it is disposed between a pair of ears 184 projecting integrally from the top of frame 170. Ears 184 are arranged to removably receive a latch pin 186 which confines the handle portion 182 in place. To install the forward end of the apron holding assembly, the pins 186 are removed and the handles 182 turned outwardly. The assembly is then placed in the opening 175 and the handles 182 turned to the inward position between the ears 184. The latch pins 186 are then dropped in place. Projections 180 on the bars 176 hold the lower end of the apron holding assembly in place.

As stated above, the supported position of the forward end of the apron holding assembly is such that the apron is disposed at about water level, such position being accomplished by selective positioning of support hooks 162 in relation to normal buoyant position of the float 62'. The amount of submergence of the float is controlled by two or more weights 114', FIGS. 9 and 10, movably seated on the upper surface of the float 62' and connected to the float by anchor chains 188.

The float 62' is connected to a lifting line 190, FIGS. 10 and 11, operating over an upper pulley 192 on the framework 136. Line 190 leads to a winch 194 also secured to the framework 136. By suitable operation of the winch 194 the float 62' can be lowered to a use position or raised to a non-use position. It can be raised, for example, when the vessel is moving from place to place. Limit chains 196 are connected between the float 62' and the hull of the vessel at the corners of the float and prevent the latter from being lifted too high so that the apron 94' cannot be damaged.

A pump 46', FIGS. 9 and 10, is disposed in the sump 154 between the bulkheads 130 and 132 and is driven by an hydraulic motor 52'. An outlet conduit 48' leads from said pump rearwardly beyond the stern of the vessel, and a conduit 198 branches off downwardly from the conduit 48' and discharges into the storage area between the bulkhead 132 and the stern of the vessel. Branch conduit 198 has a control valve 200 therein, and conduit 48' rearward of the connection with branch conduit 198 also has a control valve 202. By suitable manipulation of valves 200 and 202, pumped liquid from the pump 46' can either be discharged out the end of conduit 48' for transfer to another vessel or discharged into the storage area of the vessel.

A control valve 204 is provided in the bulkhead 132 above the bottom of the vessel for controlling flow between the sump and storage area, a control valve 206 is provided in the bulkhead 132 at the bottom of the vessel also for controlling flow between the sump and storage area, and a control valve 208 is provided in the rearward wall of the vessel for controlling outward or inward outside flow relative to the storage area. These valves are all provided with deck disposed operating means, and their function will be described in greater detail hereinafter.

A power plant 54' is provided on the deck to supply the necessary power for the hydraulic cylinders, hydraulic motors, and any other needs.

The vessel is self propelled, and with particular reference to FIGS. 9, 10, 14 and 15, it has a propeller assembly 214 at the stern driven by an hydraulic motor 216 and secured to an upright hollow shaft 218 passing up through a tubular housing 220. Housing 220 is removably received in recesses 222 in upper and lower horizontal walls 224 of a vertical well 226 opening through the stern of the vessel. The housing 220 is supported on the top wall 224 by means of a top flange 228 on such housing and is maintained in non-rotative position by depending fingers 230, arranged to project through suitable apertures 232 in the respective upper and lower walls 224.

Shaft 218 has an upper flange 234 which provides rotatable support for said shaft on the flange 228 through the medium of a bearing bushing 236 secured to the flange 228. A lower bearing bushing 238 is connected to a flange 240 at the bottom end of housing 220.

The upper end of shaft 218 carries wheel 242 for rotatably positioning the propeller assembly 214 in a vessel guiding function.

The propeller assembly may be raised when desired, and for this purpose, a bottom stern portion of the vessel, namely, the area in which valve 208 is located, is offset forwardly. A lifting line 246 is connected to a lower point on the housing and extends upwardly through an opening 248 in upper wall 224. The line passes over an upper pulley 250 suitably supported on the framework 136 and then leads to a winch 252 also secured to the framework 136. By suitable operation of the winch, the steering mechanism can be raised or lowered. In a raised position, the propeller assembly 214 is disposed upwardly in the offset portion 244 to be out of the way such as when the vessel is being moved on a trailer or at other times when it is desired that it does not not project below the bottom of the vessel.

A forward, laterally directed propeller assembly 254, FIG. 10, is contained in a lateral tubular housing 256, also seen in FIG. 9, open at the ends. Propeller assembly 254 driven by a reversible hydraulic motor 258 and is utilized to provide efficient maneuverability of the bow of the vessel. A false bottom wall 260 extends from the housing 256 to a rearward point at about bulkhead 130.

The operation of the vessel will now be described including launching thereof. With the storage area and sump empty, the vessel will tip down at the bow so that the water line thereon when it is first launched will be approximately along the phantom line 264, FIG. 10. The rear valve 208 is then opened and the vessel will right itself by the flooding of the storage area between bulkhead 132 and the stern. Valves 204 and 206 are in a closed position at launching.

If the vessel is to be transported in the water to a skimming site either under its own power or by being towed, the doors 150 are closed to the bow-like position shown in phantom lines in FIG. 9 and the float 62' is raised by winch 194. When the vessel reaches the skimming site, the doors 150 are opened to their flared position and the float 62' lowered by means of the winch 194. The position of the apron 94' is adjusted at the rearward portion of the float 62' by means of the weights 114' so as to allow the desired depth of water inlet to be skimmed into the sump.

Upon forward movement of the vessel, the fluid to be skimmed passes over the bottom wall of apron 94' into the sump 154 and then is pumped out by pump 52'. If it is desired to empty the oil-water mixture into the storage area, valve 202 is closed and valve 200 is opened. Valve 208 remains open at this time. The storage area will thus fill, and since the oil floats to the top, oil-free water will discharge through valve 208.

When the storage area is full, as can be determined when oil begins to escape from valve 208, it can be emptied into a waiting vessel or by transporting the vessel itself to a dump area. In such emptying operation, the float 62' is first raised to prevent inflow of the oil-water mixture at this time, and if the vessel is to be transported to a distant dump area, the valve 208 is fully closed. In the discharge of the oil from the storage area, valve 200 is closed, valve 202 is opened, valve 206 remains closed, valve 204 is opened, and the float 62' maintained in its raised position. Upon operation of the pump, valve 208 is opened a selected amount to meter the inflow of water substantially equal to the pump volume. As the pump operates and drives oil through the conduit 48', the inflow of water through valve 208 will allow the water level to rise with the oil flowing into the sump through valve 204. When water begins to flow through valve 204, it is apparent that all the oil in the sump area has been discharged. When the vessel resumes a skimming operation, valves 204 and 202 are closed and valves 208 and 200 opened.

When it is desired to haul the vessel out of the water, valves 200, 204 and 208 are closed. Valve 202 is opened as is valve 206, and the float 62' is raised. The pump is then operated to empty out all of the water in the sump and storage areas. As such fluid is emptied out, the bow will tip down. Such raises the stern for ease of loading on a trailer.

The apron 94' allows the independent buoyant operation of the float relative to the main vessel 10', including up and down movement, lateral tilting, longitudinal tilting, and oblique tilting. A uniform flow of oil-water mixture is thus maintained even though the water surface is surging and billowing.

It is to be understood that the forms of my invention herein shown and described are to be taken as a preferred examples of the same and that various changes in the shape, size and arrangement of parts may be resorted to without departing from the spirit of my invention, or the scope of the subjoined claims.

Having thus described my invention, I claim:

1. Apparatus for skimming pollutants and the like from the surface of water comprising a vessel having forward and rearward ends, means defining an opening leading rearwardly in the forward end of said vessel, a sump in said vessel having a bottom wall and peripheral defining side walls, one of said side walls having an inlet in communication with said opening, the lower end of said inlet being below the water level of the vessel, pump means communicating with said sump for removing water and pollutants therefrom, a float having forward and rearward ends disposed in said opening forward of said sump, said float having a pair of integrally connected elongated side buoyant portions defining a longitudinal opening therebetween for the free flow of water and pollutants in said opening independent of the action of said pump, laterally extending insert means removably connected to said float, said insert having top and bottom walls defining a fluid flow opening therebetween, said bottom wall being disposed in a submerged position to allow said flow of water thereover, and a flexible apron having bottom and side walls connected between said insert means of said float and said sump in an arrangement allowing the float at both ends to have vertical buoyant movement independently of the buoyant movement of said vessel, said apron having sufficient slack in its connection between said support means and said sump wherein water thereunder billows it rearwardly to form a spillway portion directing the inflow of water from over said support means into said sump and at the same time allowing the individual vertical buoyant movement of said float relative to the vessel.

2. The oil skimming apparatus of claim 1 including a pair of hinged doors at the front of said vessel, and drive means for said doors arranged to swing them out to a flared oil pickup position to expose said opening and arranged to swing them to a pointed position to close said opening and form a bow for the vessel.

3. The oil skimming apparatus of claim 1 including lifting means on said vessel arranged to raise said float to an elevated non-use position on the vessel.

4. The oil skimming apparatus of claim 3 including a propeller-rudder assembly, an upright housing supporting said propeller-rudder assembly, for rotative steering movement, and lifting means for said housing arranged to raise the latter to an elevated position.

5. The oil skimming apparatus of claim 1 including upright guide means on said vessel, and follower means on said float engageable with said guide means for permitting individual buoyant movement of said float relative to the vessel, said guide means and follower means providing a forward and rearward drive connection between said vessel and said float.

6. The oil skimming apparatus of claim 5 wherein said guide means is disposed at the rearward portion of said float.

7. The oil skimming apparatus of claim 1 including means defining an opening in said storage reservoir adjacent the bottom thereof leading exteriorly of said vessel below the water level, flow control means in said opening, means defining a first passageway between said sump and said storage reservoir adjacent the bottom, flow control means in said first passageway, means defining a second passageway between said sump and said storage reservoir above the bottom, and flow control means in said second passageway.

8. The oil skimming apparatus of claim 1 including at least two pairs of said floats disposed in said opening in side by side relation.

9. Apparatus for skimming pollutants and the like from the surface of water comprising a vessel having forward and rearward ends, means defining an opening leading rearwardly in the forward end of the vessel, a sump in said vessel having a bottom wall and peripheral defining sides, one of said sides having an inlet opening the lower end of which is below the water level of the vessel, pump means communicating with said sump for removing water and pollutants therefrom, a float in the opening in said vessel extending longitudinally forwardly of said sump and having a longitudinal opening between its sides, laterally extending support means on said float disposed in a submerged position to allow an inflow of water through said opening to flow thereover, and interconnecting means connected between said vessel and said support means of said float in an arrangement allowing the float to move independently of said vessel in a vertical direction, said interconnecting means forming a spillway portion directing the inflow of water from over said support means into said sump and at the same time allowing the individual vertical movement of said float relative to the vessel, a pair of hinged doors at the front of said vessel, and drive means for said doors arranged to swing them out to a flared oil pickup position and arranged to swing them to a pointed position forming a bow for the vessel.

* * * * *